T. S. CATLIN.
ANIMAL TRAP.
APPLICATION FILED JAN. 24, 1920.

1,396,810.

Patented Nov. 15, 1921.
2 SHEETS—SHEET 1.

Inventor
Thomas S. Catlin

By Edgar M. Kitchin
His Attorney

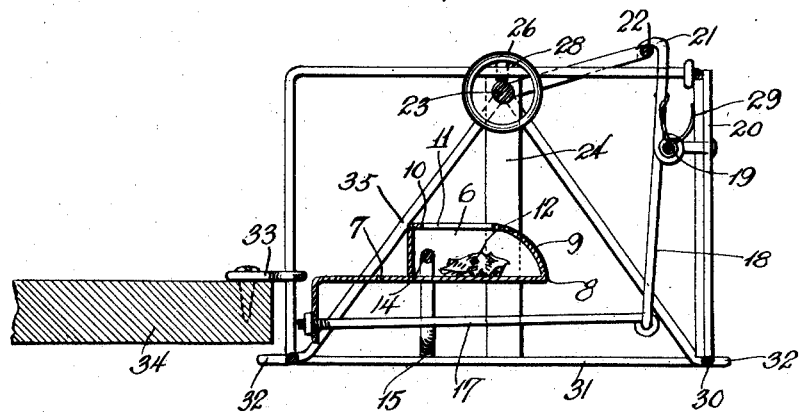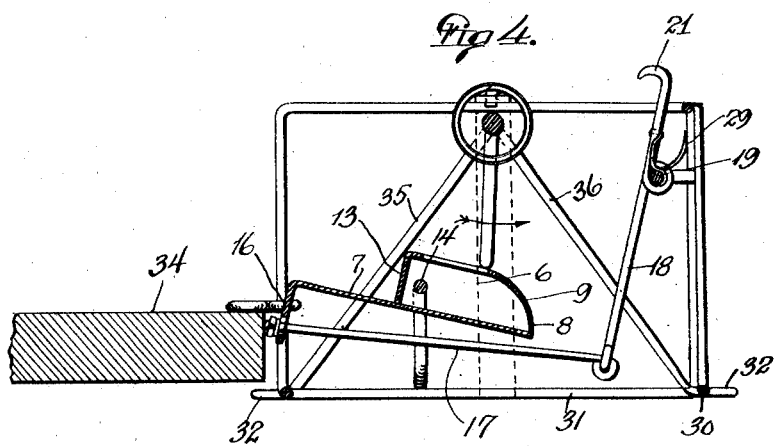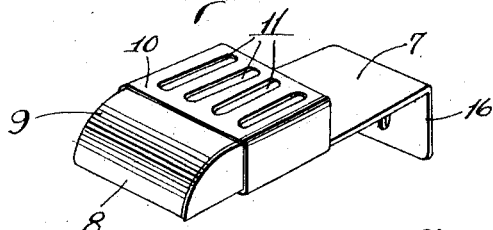

UNITED STATES PATENT OFFICE.

THOMAS S. CATLIN, OF WAVELAND, INDIANA.

ANIMAL-TRAP.

1,396,810. Specification of Letters Patent. Patented Nov. 15, 1921.

Application filed January 24, 1920. Serial No. 353,751.

*To all whom it may concern:*

Be it known that I, THOMAS S. CATLIN, a citizen of the United States, residing at Waveland, in the county of Montgomery and State of Indiana, have invented certain new and useful Improvements in Animal-Traps; and I do hereby declare the following to be a full, clear, and exact description of the invention, such as will enable others skilled in the art to which it appertains to make and use the same.

The present invention relates to improvements in animal traps, and has for an object to provide an improved trap which will become automatically re-set to the end that great numbers of animals may be killed with an initial setting thereof.

It is another object of the present invention to provide an improved trap of this character which will be made from wire bent to provide a strong and durable structure capable of attachment to shelves or sills, as, for instance, in barns which are infested by rats.

A further object of the present invention resides in providing an improved trap in which the animal will not be able to make away with the bait, and wherein the animal will be thrown away from the trap so as not to interfere with the destruction of subsequent animals that may be attracted thereby.

With these and further objects in view as will in part hereinafter become apparent and in part be stated, the invention comprises certain novel constructions, combinations and arrangements of parts as subsequently specified and claimed.

In the accompanying drawings,—

Fig. 3 is a cross sectional view of the same, showing the trap in the set position.

Fig. 4 is a similar view after the same has been sprung, and

Fig. 5 is a perspective view of the bait box.

Figure 1:
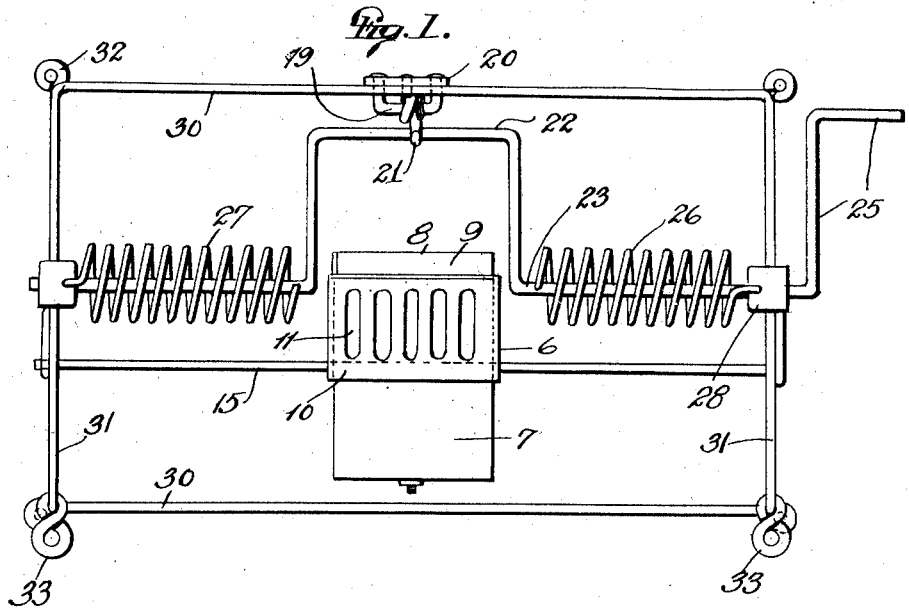
Figure 1 is a top plan view of an improved animal trap constructed in accordance with the present invention.
Figure 2:
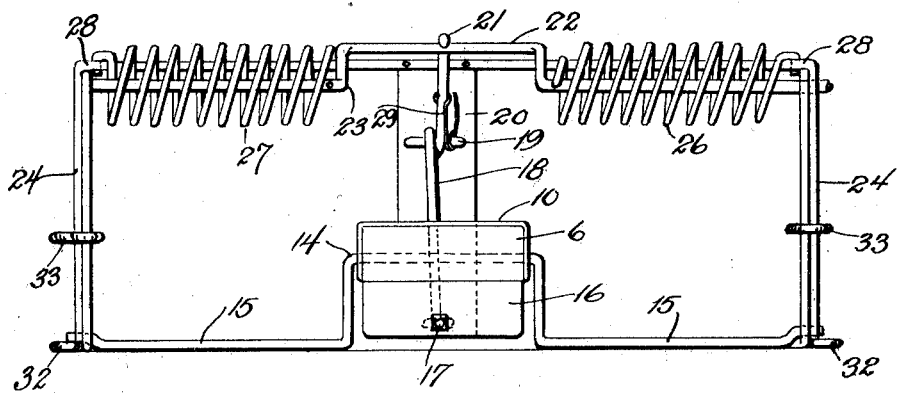
Fig. 2 is a side elevation thereof.

Referring more particularly to the drawings, which show only one embodiment of which the invention is susceptible, 6 designates a bait box, which is made in accordance with any suitable construction, but preferably of sheet metal as I have illustrated it, in which the major portion or body of the sheet metal strip forming the same is arranged horizontally, as indicated at 7, and at one end is returned upon itself or bent upwardly, as indicated at 8, providing a curved front wall 9. The top of the box 10 is formed with elongated slots 11 through which the animal may scent the bait 12. The rear end of the top 10 is bent down to form a rear wall 13 closing the bait box 6 at this point. The box 6, therefore, excludes the animal from access to the bait 12, but allows the odor thereof to escape through the slots 11 to attract the animal. The bait box 6 is supported for rocking movement on a horizontal bar 14 forming a portion of the wire frame and being bent or offset upwardly from a brace 15 of wire that runs transversely across the trap at the rear of the central portion thereof. The rear end of the sheet metal body 7 is turned down to provide an arm 16 to engage with the rear end of a link 17 having connection at its forward end to the lower end of a lever 18. The lever 18 is fulcrumed or pivoted at 19. This fulcrum or pivot 19 is provided by the intemediate portion of a piece of wire bent substantially U-shaped, as shown in Fig. 1, and having its ends upset against a plate 20. The upper end of the lever 18 above its fulcrum 19 is bent over into a hook or catch 21 normally engaged with a beater 22 in the form of a crank bent from a shaft 23 mounted to rotate in a pair of side plates 24, and having projecting at one side thereof a handle 25 by which the shaft 23 may be rotated. Coil springs 26 and 27 have their ends respectively engaged with the upper overturned ends 28 of the side plates 24, and the shaft 23, as clearly shown in Figs. 1 and 2.

A spring 29 is coiled about the pivot point 19 of the lever and has its opposite ends engaging respectively against the lever 18 and the front plate 20 for the purpose of normally urging the hook or catch 21 into engagement with the beater 22.

The frame of the trap is preferably made up of wire or other similar material bent to form longitudinal and transverse members 30 and 31, respectively, which provide a substantially rectangular structure open throughout yet of sufficient strength for the purposes demanded. At the lower corners of the trap, the wire is bent to form eyes 32 for the passage of nails, screws, or other fastening means, by which the trap may be secured to the floor or other supporting surface.

In addition, eyes 33 are carried by the rear portion of the trap at an elevation above the bottom thereof for the purpose of attaching the trap to an elevated support, such, for instance, as the shelf or barn sill, indicated at 34, in Figs. 3 and 4. In this case, the trap is suspended beyond the edge of the sill 34. Wire braces diagonally disposed are shown at 35 and 36, and extend from the forward and rear lower edges, respectively, upward toward the side plates 24 for strengthening the structure and especially the shaft 23.

In use, the trap is, for instance, secured to the shelf or sill 34 in Fig. 3, the platform provided by the sheet metal body 7 being in substantial alinement with the upper surface of this shelf. Bait 12 having been placed in the box 6, and the coil springs 26 and 27 having been wound by turning the handle 25, the trap is in condition for operation, it being understood that the beater 22 is engaged with the hook or catch 21, as also shown in Fig. 3. The spring 29 will urge the catch 21 to remain in engagement with the beater 22, although the coil springs 26 and 27 are tensioned to rotate the beater 22 in the direction of the arrow indicated in Fig. 4. The springs 26 and 27 are thus maintained in a potential condition in readiness for operation when the catch 21 is withdrawn.

An animal, such as a rat, scenting the bait 12, will walk out upon the platform 7 and endeavor to get at the bait through the slots 11. As soon as the center of gravity of the animal passes forward of the pivot point 14, the bait box 6 will tilt forwardly to the position shown in Fig. 4. This tilting movement of the bait box is accompanied by the drawing rearwardly of the link 17, which pulls upon the lever 18, causing the withdrawal of the catch 21 from the beater 22. The coil springs 26 and 27 are, therefore, free to turn the shaft 23 and beater 22, which they do at a very rapid rate in a counter-clockwise direction. The relative arrangement of the beater 22 and the bait box 6 is such as to bring the animal into a position whereat the beater 22 may forcibly strike the rear part of the animal's neck, breaking the latter, and at the same time moving the animal forward and carrying him over the front end of the bait box. The rounded wall 9 of the bait box will facilitate this throwing of the animal from the trap. The animal is thus precipitated into the lower part of the barn where a receptacle may be provided to catch it. As soon as the animal is thus thrown from the trap, the coil spring 29 will restore the catch 21 into the path of the rotating beater 22 and will thus arrest the movement of the latter approximately after one rotation of the same. The bait box 6 will also be restored to the initial position shown in Fig. 3 in readiness to receive subsequent animals. Approximately a single rotation of the beater 22 will be required to kill each animal and to remove them from the trap, so that the trap will be re-set automatically a number of times, and the coil springs 26 and 27 will be of such a length that one winding will suffice for a number of rotations of the beater 22.

As shown more particularly in Fig. 5, the top of the bait box is made slidable so as to expose the interior of the box for the purpose of inserting and removing the bait. However, this object may be accomplished by different construction if desired.

What is claimed is:—

1. An animal trap comprising a frame, a rotary shaft journaled therein, a spring-pressed beater carried by the shaft, a keeper pivoted to the frame and extending in the path of the beater for preventing movement thereof, a bait box pivoted in the frame adjacent the path of travel of the beater when released, the box being poised to be tilted on its pivot by the weight of an animal thereon, said box having the front inclined wall adapted to enable ease of discharge of an animal from the frame when struck by the beater while on the bait box, and connections between said bait box and keeper for removing the keeper from the path of the beater when the box is tilted.

2. An improved animal trap including a wire frame, a shaft journaled in said frame and having a beater bent therefrom, coil springs wound about the shaft at opposite sides of said beater, means for turning the shaft to wind said springs to a potential condition, a keeper for holding the beater against rotation by said springs, a pivoted bait box having connections with said keeper and adapted to be tilted by the weight of the animal thereon for causing the withdrawal of the keeper from the beater, and means for supporting the trap at the edge of a shelf or sill with the bait box substantially in the same plane with said shelf or sill.

In testimony whereof I affix my signature in presence of two witnesses.

THOMAS S. CATLIN.

Witnesses:
  QUINCY A. MYERS,
  HARDY W. ROBBINS.